United States Patent [19]

Hagen et al.

[11] 3,818,036

[45] June 18, 1974

[54] PRODUCTION OF BENZOXETANE-2-SPIRO-2-(1,3-DIAZOCYCLOALKANES)

[75] Inventors: Helmut Hagen, Frankenthal; Friedrich Becke, Heidelberg, both of Germany

[73] Assignee: Badische Anilin- & Soda-Fabrik Aktiengesellschaft, Ludwigshafen/Rhein, Germany

[22] Filed: July 2, 1971

[21] Appl. No.: 159,496

[30]     Foreign Application Priority Data
July 14, 1970   Germany.......................... 20345758

[52] U.S. Cl............... 260/309.7, 252/500, 260/8.6, 260/8.8, 260/251 R
[51] Int. Cl............................................ C07d 51/18
[58] Field of Search...................... 260/25 R, 309.7

[56]               References Cited
              UNITED STATES PATENTS
3,631,046   12/1971   Hardtmann..................... 260/256.4

*Primary Examiner*—Donald G. Daus
*Assistant Examiner*—R. V. Rush
*Attorney, Agent, or Firm*—Johnston, Keil, Thompson & Shurtleff

[57]               ABSTRACT

Benzoxetane 2-spiro-2'-(1',3'-diazacycloalkanes) by prepared reaction of a salicyl-aldehyde with a diaminoalkane and sulfur and the benzoxetane-2-spiro-2'-(1',3'-diazacycloalkanes). The compounds obtainable by the process of the invention, such as benzoxetane-2-spiro-2'-imidazolidine and its 4,6-dichloro-substituted derivative or benzoxetane-2-spiro-2'-hexahydropyrimidine and its 4,6-dichloro-substituted derivative, are auxiliaries for the textile industry, plant protection agents and valuable starting materials for the production of plant protection agents and dyes.

9 Claims, No Drawings

PRODUCTION OF BENZOXETANE-2-SPIRO-2-(1,3-DIAZOCYCLOALKANES)

This invention relates to a process for the production of new benzoxetane-2-spiro-2'-(1',3'-diazacycloalkanes) by reaction of a salicylaldehyde with a diaminoalkane and sulfur.

The invention also relates to the new benzoxetane-2-spiro-2'-(1',3'-diazacycloalkanes) themselves.

We have found that benzoxetane-2-spiro-2'-(1',3'-diazacycloalkanes) having the general formula:

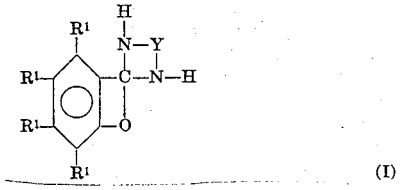

(I)

in which the individual radicals $R^1$ may be identical or different and each denotes a hydrogen atom, a halogen atom, an aliphatic radical or an alkoxy group; Y denotes the radical

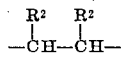

or the radical

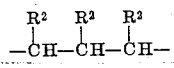

and the individual radicals $R^2$ may be identical or different and each denotes a hydrogen atom or an aliphatic radical are obtained advantageously by reacting a salicylaldehyde having the general formula:

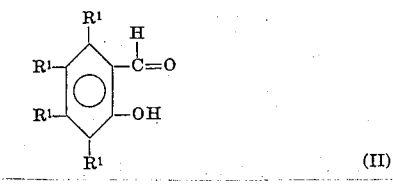

(II)

in which $R^1$ has the meanings given above with a diaminoalkane having the general formula:

$$H_2N\text{-}Y\text{-}NH_2 \quad (III)$$

where Y has the meanings given above, and with elementary sulfur.

When salicylaldehyde and ethylenediamine are used, the reaction according to the invention may be represented by the following formulae:

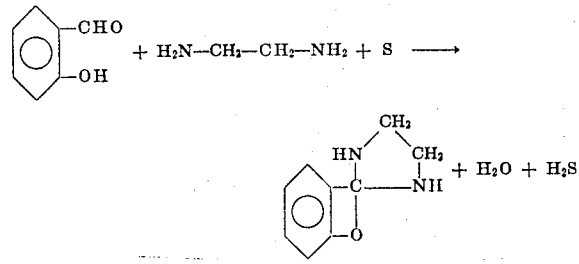

The process according to the invention gives the new benzoxetane-2-spiro-2'-(1',3'-diazacycloalkanes) in good yields and high purity.

The starting material (II) is as a rule reacted with starting material (III) and elementary sulfur in stoichiometric amounts. Starting materials (III) and/or sulfur may however be used in an excess, for example of up to 1.2 times the stoichiometric amount based on starting material (II). Preferred starting materials (II) and (III) and accordingly preferred end products (I) are those in whose formulae the individual radicals $R^1$ may be identical or different and each denotes a hydrogen atom, a bromine atom, a chlorine atom, an alkyl radical having one to ten, particularly one to four, carbon atoms, an alkoxy group having one to six carbon atoms, Y denotes the radical

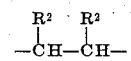

or the radical

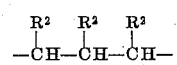

and the individual radicals $R^2$ may be identical or different and each may denote a hydrogen atom or an alkyl radical having one to four carbon atoms. The said radicals may also bear groups which are inert under the reaction conditions, for example alkoxy or alkyl groups having one to four carbon atoms, as substituents.

The following are suitable as starting materials (II): salicylaldehyde, 3,5-dichlorosalicylaldehyde, 3,5-dibromosalicyl-aldehyde, 3,4,5,6-tetramethyl-salicylaldehyde, 6-ethylsalicyl-aldehyde, 3-methoxysalicylaldehyde, 3,5-dipropoxysalicylaldehyde, 3-decylsalicylaldehyde and 3-methyl-5-chlorosalicylaldehyde.

Examples of suitable starting materials (III) are:
1,2-diaminoethane, 1,2-diaminopropane, 3,4-diaminohexane,
2,3-diaminobutane, 1,3-diaminopropane, 1,3-diaminobutane,
1,3-diamino-2-ethylhexane and 1,2,3,4-tetramethyl-1,3-diaminopropane.

The reaction is carried out as a rule at a temperature within the range from 60° to 160°C, preferably from 80° to 120°C, at atmospheric or superatmospheric pressure, continuously or batchwise. It is advantageous to use organic solvents which are inert under the reaction conditions, for example aromatic hydrocarbons such as benzene or toluene; alcohols such as methanol, ethanol, propanol or butanol; glycol ethers such as glycol monomethyl ether or glycol monoethyl ether; or appropriate mixtures. A ratio of from 5 to 20 moles of solvent per mole of starting material (II) is preferred.

The reaction may be carried out as follows:
Starting materials (II) and (III), with or without a solvent, are heated to the reaction temperature and then elementary sulfur is added. The mixture is then kept for from ten to fifteen hours at the reaction temperature until the evolution of hydrogen sulfide has ceased. The end product is then separated by a conventional method, for example by crystallization and filtration of the mixture.

The new compounds which can be obtained by the process according to the invention are auxiliaries for the textile industry, plant protection agents and valuable starting materials for the production of plant protection agents and dyes. For example, after they have been quaternized with dimethyl sulfate, an antistatic finish may be achieved on synthetic fibrous material, for example polyester or polyamide fibrous material. Moreover the substances according to this invention, when applied at the rate of from 5 to 50 g per kg of fibrous material using conventional finishing methods, impart to the finished textile material not only an antistatic effect but also a soft or firm handle depending on the constitution of the compound. For example polyester piece goods may be impregnated with an aqueous impregnating liquor of the said concentration at a temperature of from 15° to 40°C and dried. The benzoxetanes exhibit fungicidal properties. Thus for example benzoxetane-2-spiro-2'-imidazolidine inhibits the growth of Aspergillus niger at the rate of 0.01 percent in the nutrient medium.

The invention is illustrated by the following Examples in which parts are by weight.

EXAMPLE 1

61 parts of salicylaldehyde and 30 parts of ethylenediamine are heated to 80°C in 200 parts of isobutanol in a stirred vessel. 16 parts of sulfur is then quickly introduced into this mixture. The reaction mixture is kept at refluxing temperature (110°C) until evolution of hydrogen sulfide ceases (after about 15 to 18 hours). After cooling to about 5° to 10°C, the deposited solid is suction filtered, washed with isobutanol and dried. 59 parts of benzoxetane-2-spiro-2'-imidazolidine is obtained having a melting point of from 202° to 204°C. After the compound has been recrystallized from water, it melts at 208°C. The yield is 73 percent of theory.

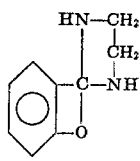

EXAMPLE 2

89 parts of 3,5-dichlorosalicylaldehyde, 30 parts of ethylenediamine and 16 parts of sulfur are reacted in 300 parts of glycol monomethyl ether as described in Example 1. 98 parts of 4,6-dichlorobenzoxetane-2-spiro-2'-imidazolidine is obtained having a melting point of from 289° to 291°C. This is equivalent to a yield of 85 percent of theory.

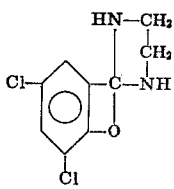

EXAMPLE 3

61 parts of salicylaldehyde, 37 parts of 1,3-diaminopropane and 16 parts of sulfur are reacted in 200 parts of isobutanol in a stirred vessel as described in Example 1. 62 parts of benzoxetane-2-spiro-2'-hexahydropyrimidine is obtained having a melting point of 234° to 236°C. This is equivalent to a yield of 70 percent of theory.

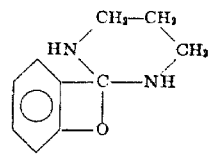

EXAMPLE 4

177 parts of 3,5-dichlorosalicylaldehyde, 74 parts of 1,3-diaminopropane and 32 parts of sulfur are reacted in 500 parts of isobutanol as described in Example 1. 178 parts of 4,6-dichlorobenzoxetane-2-spiro-2'-hexahydropyrimidine is obtained having a melting point of 291° to 295°C (with decomposition). The yield is equivalent to 73 percent of the theory.

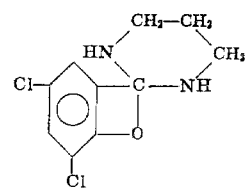

We claim:
1. A process for the production of a benzoxetane-2-spiro-2'-(1', 3'-diazacycloalkane) of the formula:

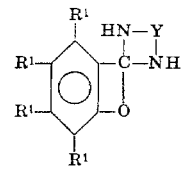

(I)

in which each $R^1$ denotes hydrogen, halogen, alkyl of one to four carbon atoms, Y denotes the radical

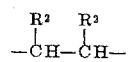

or the radical

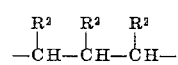

wherein each $R^2$ denotes hydrogen or alkyl of one to four carbon atoms, which process comprises: reacting a salicylaldehyde having the formula:

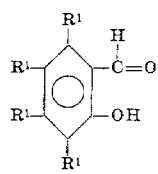

(II)

in which $R^1$ has the meanings given above with a diaminoalkane having the formula:

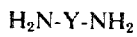

$H_2N$-Y-$NH_2$ (III)

in which Y has the meanings given above, and with elementary sulfur at a temperature of about 60°C. to 160°C.

2. A process as claimed in claim 1 wherein the reaction is carried out at a temperature of 80°C. to 120°C.

3. A process as claimed in claim 1 wherein the reactants are used in a stoichiometric amount or with an excess of the diaminoalkane or the sulfur of up to 1.2 times the stoichiometric amount.

4. A process as claimed in claim 1 wherein the reaction is carried out in the presence of an organic solvent which is inert to the reaction conditions.

5. A process as claimed in claim 4 wherein said solvent is present in an amount of about 5 to 20 moles per mole of the salicylaldehyde reactant (II).

6. A compound of the formula

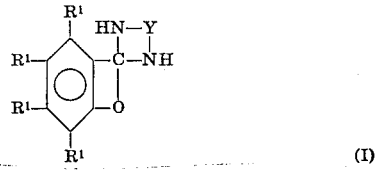

(I)

wherein each $R^1$ denotes hydrogen, bromine, chlorine or alkyl of one to four carbon atoms and Y denotes one of the radicals

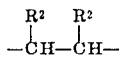

or

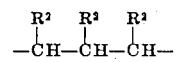

in which $R^2$ denotes hydrogen or alkyl of one to four carbon atoms.

7. A compound as claimed in claim 6 wherein $R^1$ is hydrogen or chlorine and Y is ethylene or propylene.

8. The compound

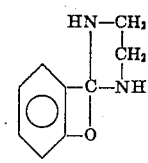

9. The compound

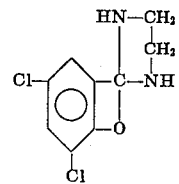

* * * * *